United States Patent
Goebel et al.

(10) Patent No.: US 8,940,169 B2
(45) Date of Patent: Jan. 27, 2015

(54) SPIRAL WOUND MEMBRANE ELEMENT AND TREATMENT OF SAGD PRODUCED WATER OR OTHER HIGH TEMPERATURE ALKALINE FLUIDS

(75) Inventors: Phillip Goebel, New Hope, MN (US); David Olson, Minneapolis, MN (US); David M. Polizzotti, Yardley, PA (US); Abdul Rafi Khwaja, Upper Gwynedd Township, PA (US)

(73) Assignee: General Electric Company, Schenectady, NY (US)

( * ) Notice: Subject to any disclaimer, the term of this patent is extended or adjusted under 35 U.S.C. 154(b) by 965 days.

(21) Appl. No.: 13/045,058

(22) Filed: Mar. 10, 2011

(65) Prior Publication Data

US 2012/0228219 A1 Sep. 13, 2012

(51) Int. Cl.
*B01D 63/10* (2006.01)
*B01D 63/12* (2006.01)
*B01D 65/02* (2006.01)

(52) U.S. Cl.
CPC .............. *B01D 63/12* (2013.01); *B01D 63/106* (2013.01); *B01D 65/02* (2013.01); *B01D 2311/04* (2013.01); *B01D 2311/10* (2013.01); *B01D 2311/18* (2013.01); *B01D 2311/2615* (2013.01); *B01D 2311/2634* (2013.01); *B01D 2313/143* (2013.01); *B01D 2313/146* (2013.01); *B01D 2321/164* (2013.01)
USPC ............ 210/321.85; 210/321.83; 210/321.76; 210/321.74

(58) Field of Classification Search
None
See application file for complete search history.

(56) References Cited

U.S. PATENT DOCUMENTS

| | | | |
|---|---|---|---|
| 4,548,714 A | | 10/1985 | Kirwan, Jr. et al. |
| 4,906,372 A | | 3/1990 | Hopkins |
| 5,562,827 A | | 10/1996 | Schmidt et al. |
| 6,168,648 B1 | | 1/2001 | Ootani et al. |
| 6,565,747 B1 * | | 5/2003 | Shintani et al. .......... 210/321.74 |
| 7,575,687 B2 | | 8/2009 | Kurth et al. |
| 7,658,872 B2 | | 2/2010 | Kurth |
| 2007/0102359 A1* | | 5/2007 | Lombardi et al. ............ 210/639 |

(Continued)

FOREIGN PATENT DOCUMENTS

| | | |
|---|---|---|
| EP | 0146298 A2 | 6/1985 |
| EP | 0147137 A2 | 7/1985 |

(Continued)

OTHER PUBLICATIONS

Search Report and Written Opinion from WO Application No. PCT/US12/27959 dated Apr. 25, 2012.

(Continued)

*Primary Examiner* — Krishnan S Menon
(74) *Attorney, Agent, or Firm* — Scott Pundsack; Borden Ladner Gervais LLP

(57) ABSTRACT

A spiral wound module is suitable for use with high temperature water that is also very alkaline or has a high pH, for example SAGD produced water. The module uses a polyamide-based membrane with a polysulfone or polyethersulfone backing material. For other components, the module uses primarily one or more of, EPDM; polyamide; polyphenylene oxide; polyphenylene sulfide; polysulfone; polyethersulfone; polysulfonamide; polyvinylidene fluoride; mylar; fiberglass; and, epoxy. Polyester is not used. Polypropylene is not used for the feed spacer. For example, a module may use a PVDF feed spacer, a nylon permeate spacer and a polysulfone center tube. The center tube may be provided with 4 rows of 0.063" diameter holes and be rolled under high tension.

22 Claims, 3 Drawing Sheets

(56) References Cited

U.S. PATENT DOCUMENTS

| | | |
|---|---|---|
| 2009/0032446 A1* | 2/2009 | Wiemers et al. .......... 210/85 |
| 2009/0056940 A1* | 3/2009 | Minnich et al. .......... 166/266 |
| 2009/0145838 A1* | 6/2009 | Knappe et al. .......... 210/457 |
| 2010/0140161 A1* | 6/2010 | Haynes et al. .......... 210/487 |

FOREIGN PATENT DOCUMENTS

| | | | |
|---|---|---|---|
| EP | 1044718 | A2 | 10/2000 |
| EP | 1637214 | A1 | 3/2006 |
| EP | 2067522 | A1 | 6/2009 |
| WO | 2007022100 | A1 | 2/2007 |

OTHER PUBLICATIONS

Produced Water Membrane Technology presentation, http://wrri.nmsu.edu/conf/forum/Bierle.pdf, uploaded Aug. 15, 2003, 30 pages.

Polizzotti, David M. et al., U.S. Appl. No. 12/971,556, filed Dec. 17, 2010.

* cited by examiner

SPIRAL WOUND MEMBRANE ELEMENT AND TREATMENT OF SAGD PRODUCED WATER OR OTHER HIGH TEMPERATURE ALKALINE FLUIDS

FIELD

This specification relates to spiral wound membrane elements or modules, to methods and apparatus for treating high temperature alkaline fluids, and to methods and apparatus for treating produced water for re-use in a steam boiler or generator in a steam assisted gravity drainage (SAGD) process.

BACKGROUND

The following discussion is not an admission that anything discussed below is citable as prior art or common general knowledge.

In various forms of oil and gas production, produced or other water streams are created that must be treated for disposal or re-use. For example, in a bitumen mining process known as Steam Assisted Gravity Drainage (SAGD), steam is produced in a boiler or generator and injected into bitumen bearing soil. The steam reduces the viscosity of the bitumen allowing a mixture of water and bitumen to flow to a production well. After this mixture is extracted, most of the oil is removed in an initial primary oil-water separation step.

The remaining water, called produced water, is hot and alkaline, with a high pH. The produced water is treated through various unit operations to make it suitable for re-use in generating steam. The produced water contains, for example, residual oil, suspended and dissolved solids (organic and inorganic), and silica. The concentration of dissolved solids may be up to about 6,000 mg/L total dissolved solids (TDS) and the silica may be at or near the limit of solubility. Oil may be removed from the produced water by a second oil-water separation step such as gas flotation or a ceramic or walnut shell filter. Hot or warm lime softening may be used to remove silica and hardness. Particle filtration, for example through an anthracite bed, may be used to reduce total suspended solids. Strong or weak acid cation exchange softeners may be used to further reduce hardness.

After treatment, the produced water can be re-used to generate steam. The steam generators used in SAGD operations commonly include a Once Through Steam Generator that produces about 80% steam (vapour) and about 20% liquid droplets. The liquid fraction is removed from the steam in a blowdown stream before the steam is injected into the bitumen deposit. The OTSG blowdown water is further processed or, where permitted, disposed for example in a tailings pond or by deep well injection. One treatment option is to evaporate or vaporize generally pure water from the blowdown, for example in a brine concentrator followed by a crystallizer, to produce dried solids for disposal.

INTRODUCTION

The following introduction is intended to introduce the reader to the detailed description to follow and not to limit or define any claimed invention.

A primary purpose of the produced water treatment steps described above is to provide water of suitable quality to the steam generator. Silica and hardness in the raw produced water in particular would rapidly foul a steam generator. However, even after a two-stage process of lime softening followed by cation exchange softening, the water reaching an OTSG in an existing SAGD operation may still have near 1 mg/L of hardness. Treated produced water in an existing SAGD operation may also contain 100 to 2,000 mg/L of dissolved organics when it reaches the OTSG.

As a result of the remaining contaminants in re-used produced water, a foulant layer still builds up on OTSG walls. The foulant layer reduces the heat transfer efficiency from the fire side of the OTSG to the water side of the OTSG, impeding steam production. To maintain steam production rates, more energy is required to overcome the insulating effect of the foulant layer to create a constant amount of steam. The OTSG must be periodically cleaned to remove the build-up. If the OTSG is not cleaned often enough, the OTSG may overheat and fail. Heat exchangers are similarly subject to fouling and must be cleaned periodically. Further, organic and other contaminants are concentrated in blowdown water, which in some cases may impede using a crystallizer to treat the blowdown.

By using a spiral wound membrane element or module upstream of the OTSG, either in place of or in combination with a cation exchange softener, the silica concentration, hardness and TDS of produced water can be reduced upstream of an OTSG. The spiral wound membrane element may have a membrane in the ultrafiltration (UF), nanofiltration (NF) or reverse osmosis (RO) range and elements with membranes in two or more of these ranges may be placed in series. To remove hardness, a set of one or more spiral wound membrane elements preferably ends with an element with a NF or RO membrane. The very low concentration of contaminants, particularly hardness, in NF or RO permeate would reduce OTSG fouling. Using an RO membrane in particular would also allow a conventional high pressure steam boiler, with a lower blowdown ratio, to be used in place of an OTSG. A spiral wound membrane module may also be used to concentrate steam blowdown water, either to reduce the volume of water to be disposed of, to replace a brine concentrator, or to otherwise pre-condition blowdown water for treatment in a crystallizer.

The produced water, however, has a very high temperature and, as mentioned above, a significant concentration of silica. Because the produced water is intended for re-use to produce steam, the process is more energy efficient if the produced water is not cooled to facilitate any treatment process. The produced water may therefore move through all process steps at a temperature of 90 degrees C. or more. In addition to the high temperature, the membranes also need to be stable at high pH, for example 9.5 or more, 10.5 or more, or 11.5 or more. Stability at high pH is required to facilitate cleaning, for example using caustic, which is preferably done at the operating temperature of 90 degrees C. or more. Stability at high pH is also required to mitigate silica fouling increasing the pH of the membrane feed water in a manner similar to the HERO™ process as practiced by GE Water & Process Technologies for operation in high-silica waters.

Spiral wound membrane technology was developed to a large extent for applications, such as seawater desalination, that are operated near ambient temperatures. Service limitations may consider a combination of temperature and pH and may be time limited. For example, in order to allow for cleaning, a membrane element be rated for a brief exposure to either heat, for example a cleaning solution at about 50 degrees C., or to a caustic cleaning solution, for example at a pH of about 12. The inventors are not aware of any commercial spiral wound membrane that is rated for use under a combination of conditions, namely a temperature of 90 degrees C. (190 degree F.) or more and a pH of 9.5 or more, 10.5 or more or 11.5 or more, that would be required to treat SAGD produced water.

A spiral wound module is described herein that is suitable for use with high temperature water that is also very alkaline or has a high pH for prolonged periods of time. The module is intended, for example, to be used for treating SAGD produced water. The module uses a combination of materials for its various components that is adapted to operate under these conditions. In addition to the temperature and pH requirements, for use on SAGD produced water the module must also be able to withstand exposure to contaminants in the produced water, which may include some dissolved organics that tend to deteriorate various polymers. The module is also adapted to be cleaned with a hot caustic solution.

The module may use a polyamide based membrane, for example a membrane selected from the Desal-3, Desal-5 or Desal-11 membrane families made by GE Osmonics, Inc. For other primary internal components, the module uses primarily one or more of the following materials, or blends of the following materials, polyamide (PA, nylon); polyphenylene oxide (PPO, NORYL™); polyphenylene sulfide (PPS); polysulfone (PSO); polyethersulfone (PES); and, polyvinylidene floride (PVDF). The outer cover (also called the outer wrap) may be made of fiberglass in an epoxy resin. Epoxy is also preferred over polyurethane as an adhesive inside the module. Various smaller internal components may be made of one or more of the plastics listed above, a durable rubber such as ethylene propylene diene Monomer (M-class) rubber (EPDM), or other durable materials such as mylar film.

Other materials are not used at all, or are at least not used in certain components. For example, polyester is not used, particularly not for the permeate spacer. Polypropylene (PP) may be used in some minor components such as a tape, but it is not used for the feed spacer. Some other materials sometimes used in making spiral wound modules, such as chlorinated polyvinyl chloride (CPVC), polyvinyl chloride (PVC) and acrylonitrile butadiene styrene (ABS), may also be avoided. Optionally, polyphenylene oxide might also be avoided since it is somewhat brittle and may be susceptible to degrade in the presence or organic contaminants, thus removing it from the list of potential components originally given above.

One module uses a PVDF feed spacer. This module also uses a nylon 6-6 and epoxy resin permeate spacer and a polysulfone center tube. The center tube is provided with 4 rows of 0.063" diameter holes. The increased number and reduced diameter of the holes reduces damage to components near the holes. The module is rolled under high tension to further increase its mechanical strength. The module components retain all or most of their required physical properties when subjected to operational loads in a fluid feed stream at 90 degrees C. or more and a pH of 9.5 or more, 10.5 or more or 11.5 or more. The element provides a substantial separation of impurities from the feed stream, the impurities including one or more of suspended solids, silica and hardness. In particular, the element is adapted to treat SAGD produced water either upstream of a steam boiler or generator, or in the steam blowdown stream.

DETAILED DESCRIPTION

Figure 1:
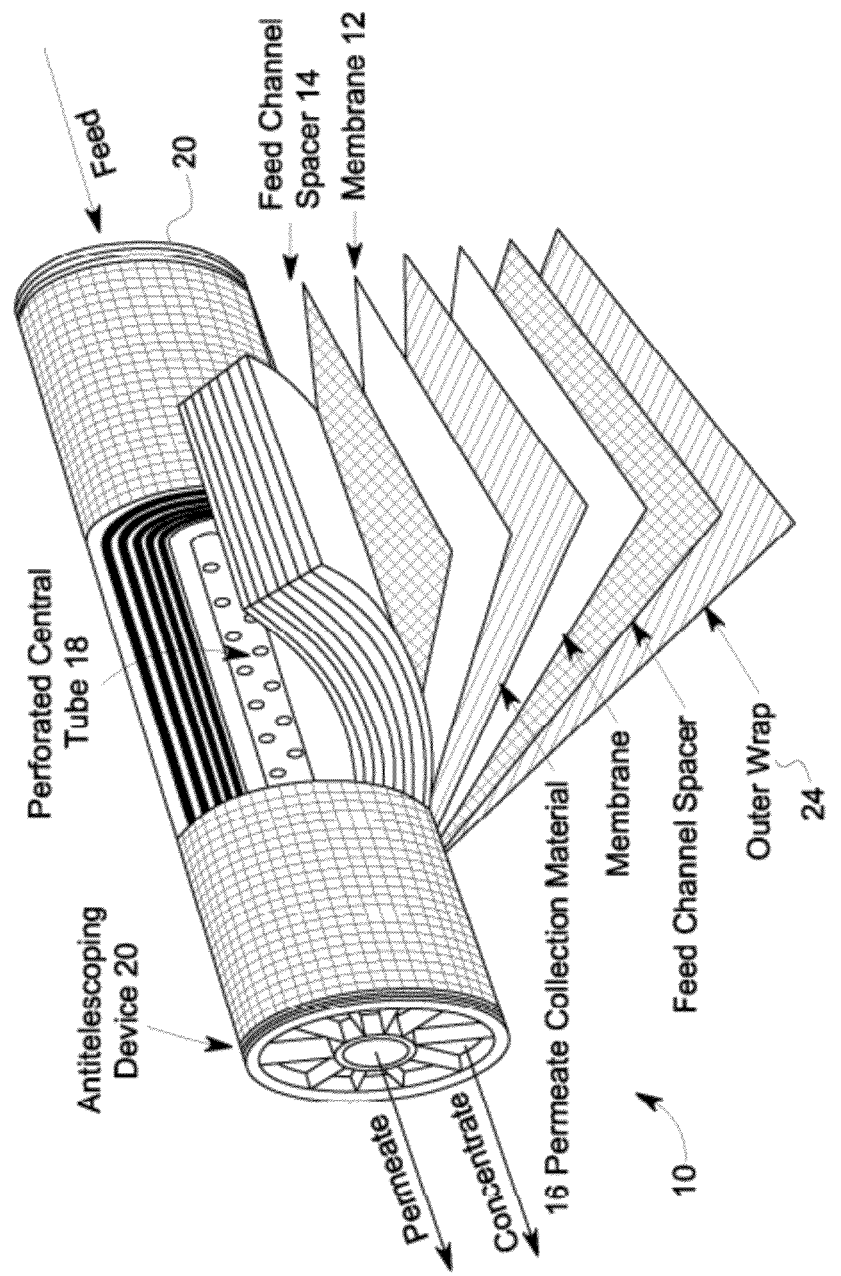
FIG. 1 shows a partially cut away isometric view of a spiral wound module.

FIG. 1 shows a spiral wound membrane module 10. One primary component is the separation membrane 12, which is formed into a flat sheet. Other primary internal components are a feed channel spacer 14, a permeate spacer (or permeate collection material) 16, a permeate collection tube or center tube 18 and an end surface holder or anti-telescoping device 20 at each end of the module 10. The membrane 12 is arranged to form an envelope around the permeate spacer 16. The edges of the envelope are sealed except that at an inside edge the permeate spacer 16 is open to perforations 22 of the center tube 18. The feed channel spacer 14 is placed over the envelope. The envelope and feed channel spacer 14 are wound around the center tube 18. Feed water can access the surface of the membrane 12 by flowing into the edge of and across the feed channel spacer 14. Permeate passes through the membrane 12, then flows through the permeate spacer 16 and center tube 18 to leave the module 10. Concentrate flows out of the downstream edge of the feed channel spacer 14 to leave the module. The anti-telescoping devices 20 are glued or taped to the center tube 18 and also held in place by an outer wrap 24. The anti-telescoping devices 20 prevent the envelopes from being pushed along the length of the center tube 18 by the feed water. An outer wrap 24 surrounds the envelopes to keep them from unwinding in use.

One or more of various other components may also be present in the module 10. For example, the membrane 12 typically comprises a membrane support or backing layer. The envelopes may be sealed with an adhesive. In a multi-stage module, two or more center tubes 18 may be connected in series by element interconnectors. The module typically has O-rings, brine seals or other end-seal gaskets and other seals. Folds in the envelope may be reinforced with a tape or film. A film or tape may also be used to provide an inner wrap. Tape may also be used to help hold the anti-telescoping devices 20 in place.

While some components of the module 10 are more critical and more highly stressed than others, in general every component must be able to withstand operation for at least a reasonable minimum service life, for example 6 months, 9 months or a year, for the module 10 to be useful in a particular application. Although the membrane is perhaps the most critical component, a failure in any of the other components might cause the module to fail. The discussion below considers the membrane first, and then describes other module components.

The membrane 12 may be a polyamide based membrane with a backing material of, for example, polysulfone or polyethersulfone. For example, one or more membranes within the Desal-3, Desal-5 or Desal-11 membrane families made by GE Osmonics, Inc. may be suitable subject to testing under the anticipated conditions. These are commercial RO or NF membranes and include, for example, the SG, DK, DL, AD, AG and AK membranes normally used for example for brackish water desalination. As described in the Examples section further below, at least the AG membranes are able to stand prolonged exposure to water at 90 degrees C. and a pH of 9.5 or 10.5. The Desal membranes are further described in more detail in U.S. Pat. No. 7,658,872, which is incorporated herein by this reference to it.

The Desal-3, Desal-5 and Desal-11 membranes are made by coating an aqueous solution of monomeric polyamines on a porous support backing material. Thereafter, the surface of the coated support material is optionally freed of excess amine solution and is contacted with an organic solvent solution of a polyacyl halide to provide an initial, or starting, reverse osmosis or nanofiltration membrane. This starting membrane may further be dried from drying agents and then treated to improve its permeability.

The porous support backing material typically comprises a polymeric material containing pore sizes which are of sufficient size to permit the passage of permeate therethrough, but are not large enough so as to interfere with the bridging over of the resulting ultrathin reverse osmosis or nanofiltration membrane. Examples of porous support backing materials that may be used to prepare the desired membrane composite of the present invention include such polymers as polysulfone and polyethersulfone.

In other components, the membrane module 10 makes use of one or more of the following materials, or blends of the following materials: polyamide (PA, nylon); polyphenylene oxide (PPO, NORYL™); polyphenylene sulfide (PPS); polysulfone (PSO); polyethersulfone (PES); polysulfonamide; and, polyvinylidene floride (PVDF), EPDM, fiberglass, epoxy and mylar. Polypropylene may be used in minor components such as a backing for a tape.

Some other commonly used materials are avoided. For example, although polyester may be the most commonly used material for a permeate spacer, we do not expect it to withstand high pH environments, particularly with elevated temperature. ABS and CPVC have been used for some components in RO modules intended for use in high pH environments, but they may not be able to withstand prolonged exposure to feed water at 90 degrees C., particularly with complex dissolved organics. CPVC in particular is unlikely to withstand prolonged exposure to high temperature. Polyphenylene oxide has also been used in RO modules intended for use in high pH environments, and is rated to withstand a temperature of 140 degrees C. These qualities make PPO basically suitable for use in high temperature and high pH environments, but it can be brittle and susceptible to degredation in the presence of to organic contaminants. Its ability to withstand exposure to complex organic contaminants in a particular feed stream would need to be confirmed.

Polypropylene is commonly used as a feed spacer in spiral wound modules. Published data suggests that PP should be able to withstand temperatures of over 90 degrees C. and a pH of over 11.5. However, in lab tests a spiral wound membrane module with a polypropylene feed spacer failed while operating at 70 degrees C. after 5 hours. The module failed primarily because the feed spacer softened and the element deformed.

In an example of a spiral would module 10 intended for use in treating SAGD produced water, the membrane 12 is an SG or AG membrane made by GE Osmonics, Inc. The feed channel spacer 14 is extruded from PVDF. The permeate spacer 16 is made from a knitted yarn of nylon 6-6 and epoxy. Epoxy is used for an adhesive in other parts of the module 10. The center tube 18 is extruded from polysulfone. An element interconnector is also extruded from polysulfone. The antitelescoping device 20 is injection molded from polysulfone. The outer wrap 24 is made of fiber-reinforced plastic, particularly fiberglass embedded in epoxy. An inner wrap is made from a polypropylene backed pressure sensitive adhesive (PSA) tape. The same tape is used on other parts of the module 10 requiring tape. Creased mylar film is used for a fold reinforcement. A concentrate seal and O-rings are made from molded EPDM rubber.

Some modifications are also made to the typical mechanical configuration of the module 10. The center tube may be provided with 3 or more rows of holes having a diameter of 0.1" or less, or perforations of other shapes having an equivalent area, for example 4 rows of 0.063" diameter holes. Compared to a more typical design using two rows of 0.125" diameter holes, the flow rate through each hole is reduced and the length of feed channel and membrane material spanning each hole is reduced. This reduces the chance of damage to the inner layer of spacers and membrane, which is important since most materials soften to some extent at high temperatures. The module may also be rolled under a higher than ordinary tension of 20 psig or more, or about 25 psig. The central tube 18 is mounted in a driven chuck assembly that is first used to roll up all of the leaves or elements of the module. Inner wrap tape is then wrapped around the element. The tension of the tape inner wrap is controlled by the tension at which the tape is allowed to unwind from a roll that it is mounted on. The tension assists the heated materials in resisting mechanical stresses.

When using the module to treat SAGD produced water, it may be desirable to reduce the concentration of organic contaminants in SAGD produced water upstream of the RO module. U.S. patent application Ser. No. 12/971,556, filed on Dec. 17, 2010, describes a process in which a treatment unit uses chemical oxidation (CO) or electromagnetic treatment (ET) to degrade or destroy organic contaminants making the produced water less likely to foul membrane surfaces. U.S. patent application Ser. No. 12/971,556 is incorporated herein in its entirety.

While the module as described above is suitable for use in service with water having a high temperature and pH, it may also be used with water under other conditions. The ability of the module to withstand extreme conditions can also be used when cleaning the module. In particular, the module may be cleaned with a hot caustic solution, for example a highly concentrated and heated solution of NaOH. The solution may be used, for example, according to known clean in place procedures. However, due to an increased reaction rate relative to typical cleaning solutions, one or more of the time, energy, water, or other consumables required for cleaning may be reduced.

EXAMPLE

High Temperature Stability Tests for Membrane Coupons

High temperature membrane stability tests were conducted on coupons of two commercially available membrane materials to determine if they could withstand high temperature (90° C.) and high pH conditions for a prolonged time period.

The two commercially available membranes are referred to as Membrane A and Membrane B in the discussion below. Membrane A is an AG brackish water membrane which is part of the Desal 11 family of membranes manufactured by GE Osmonics. The AG membrane consists essentially of a polyamide based separation layer on a polysulfone based support layer. Membrane B is a Duracid KH membrane manufactured by GE Osmonics.

The study was designed to simulate high temperature conditions that can exist in applications like the treatment of produced water from steam assisted gravity drainage (SAGD) oil production sites. Several membrane coupons of each of Membrane A and Membrane B were soaked in solutions having three pH conditions (pH 7, 9.5 and 10.5) in six beakers maintained at 90 degrees C. for several weeks. Coupons from these beakers were pulled out from time to time and tested for salt passage. Failure of the membrane would be determined by tracking the salt passage over time and identifying when a significant increase in salt passage is observed. An increase in salt passage indicates that the membrane material has either developed holes or has failed in some other manner and cannot reject salt as per its original design.

The membrane coupons pulled from each beaker were tested on a cross-flow membrane cell (SEPA cell) under the following conditions:

Pressure (TMP): 225 psig
Temperature: 25° C.±2° C.
Feed: 2000 ppm NaCl
Feed pH: 7.0±0.5
Concentrate Flow Rate: 1 GPM Each test run lasted for 22-24 hrs. The percentage of feed salt that passed through the membrane was calculated for various intervals within the run and then used to calculate an average salt passage for the membrane tested for the relevant week of the test period.

Figure 2:
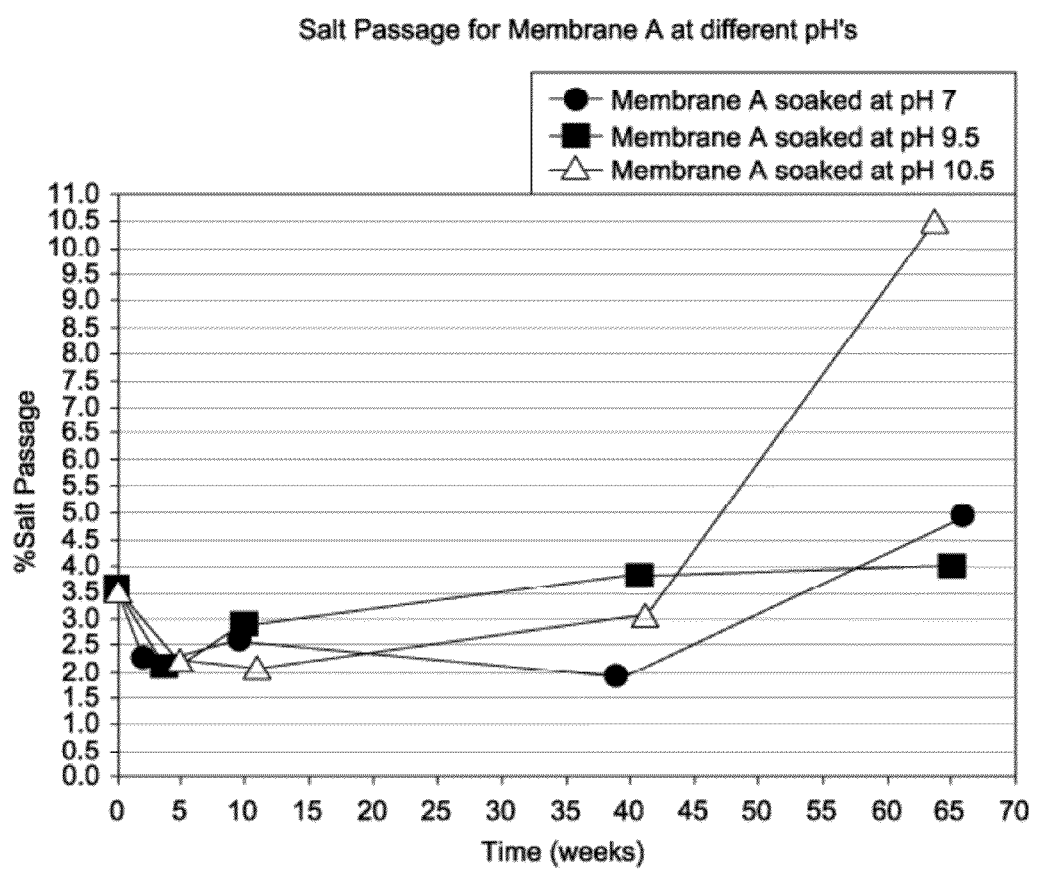
FIG. 2 shows percent salt passage data over time for one membrane type.
Figure 3:
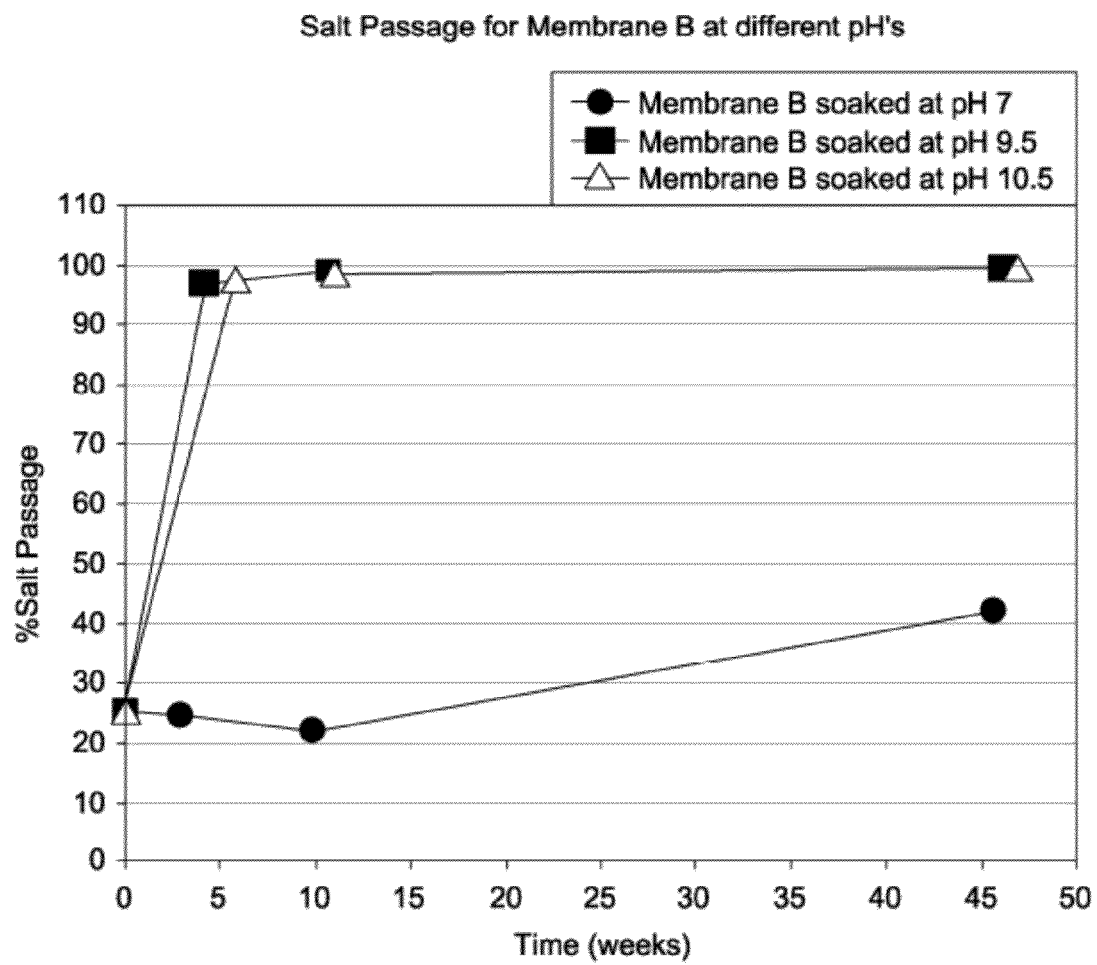
FIG. 3 shows percent salt passage data over time for another membrane type.

FIG. 2 shows the percent salt passage data for the Membrane A coupons. As indicated in FIG. 2, Membrane A was stable at a pH of 9.5 for at least 65 weeks and at a pH of 10.5 for somewhere between 41 weeks and 64 weeks. FIG. 3 shows the percent salt passage data for the Membrane B coupons. As shown in FIG. 3, Membrane B was not stable for more than 5 weeks at a pH of either 9.5 or 10.5.

What is claimed is:

1. A spiral wound membrane module comprising,
   a membrane envelope comprising a membrane material and a permeate spacer;
   a feed spacer adjacent the membrane envelope;
   a center tube, wherein the membrane envelope and feed spacer are wrapped around the center tube; and,
   an anti-telescoping device attached to the center tube beside the membrane envelope and feed spacer,
   wherein the permeate spacer, center tube, and anti-telescoping device are each made primarily of a material, or a blend of materials, chosen from the set of, polyphenylene oxide; polyamide; polyphenylene sulfide; polysulfone; polyethersulfone; polysulfonamide; and, polyvinylidene fluoride; and
   wherein the feed spacer is made primarily of PVDF.

2. The spiral wound membrane module of claim 1 wherein the permeate spacer, center tube, and anti-telescoping device are each made primarily of a material, or a blend of materials, chosen from the set of, polyamide; polysulfone; and, PVDF.

3. The spiral wound membrane module of claim 1 wherein the permeate spacer is made primarily of nylon 6-6 and the center tube is made primarily of polysulfone.

4. The spiral wound membrane module of claim 3 wherein the anti-telescoping device is made primarily of polysulfone.

5. The spiral wound membrane module of claim 1 wherein the membrane material consists essentially of a polyamide based separation layer and a polysulfone based support layer.

6. The spiral wound membrane module of claim 1 wherein the permeate spacer is made essentially without polyester.

7. The spiral wound membrane module of claim 6 made essentially without polyester.

8. The spiral wound membrane module of claim 1 wherein the feed spacer is made essentially without polypropylene.

9. The spiral wound membrane module of claim 1 further comprising an outer cover constructed of fiberglass embedded in epoxy resin.

10. The spiral wound membrane module of claim 1 wherein the center tube is joined to the anti-telescoping device by an epoxy resin adhesive.

11. The spiral wound membrane module of claim 1 wherein the membrane enveloped is made of a folded sheet of membrane material, further comprising a creased sheet of mylar over the fold in the membrane material.

12. The spiral wound membrane module of claim 1 made essentially without chlorinated polyvinyl chloride (CPVC).

13. The spiral wound membrane module of claim 1 made essentially without polyphenylene oxide.

14. The spiral wound membrane module of claim 1 made essentially without ABS.

15. The spiral wound membrane module of claim 1 wherein the center tube is perforated with holes having a diameter of 0.1" or less, or other perforations of an equivalent area.

16. The spiral wound membrane module of claim 15 having 3 or more rows of the holes.

17. A process comprising flowing produced water from a steam assisted gravity drainage operation through a spiral wound membrane module according to claim 1.

18. The process of claim 17 wherein the produced water is maintained at a temperature of 90 degrees Celcius or more and further comprising a step of increasing the pH of the produced water to 9.5 or more before flowing it through the spiral wound membrane module.

19. The process of claim 17 further comprising a step of cleaning the spiral wound membrane module with a cleaning solution having a pH of 9.5 or more and a temperature of 90 degrees Celcius or more.

20. The process of claim 17 further comprising a step of using chemical oxidation or electromagnetic treatment to degrade or destroy organic contaminants in the produced water before flowing it through the spiral wound membrane module.

21. The process of claim 18 wherein the produced water is a steam generation blowdown stream.

22. The process of claim 17 further comprising flowing permeate from the spiral wound membrane module to a steam boiler or generator.

* * * * *